June 13, 1972 — C. K. FREDERICKS — 3,669,820

CELLULAR STRUCTURE

Filed June 19, 1970 — 7 Sheets-Sheet 1

INVENTOR.
CARL K. FREDERICKS
BY Fulwider, Patton, Rieber, Lee and Utecht
ATTORNEYS June 13, 1972   C. K. FREDERICKS   3,669,820
CELLULAR STRUCTURE Filed June 19, 1970   7 Sheets-Sheet 3

INVENTOR.
CARL K. FREDERICKS
BY Fulwider, Patton, Rieber,
Lee and Utecht
ATTORNEYS June 13, 1972  C. K. FREDERICKS  3,669,820
CELLULAR STRUCTURE Filed June 19, 1970  7 Sheets-Sheet 4

INVENTOR.
CARL K. FREDERICKS
BY Fulwider, Patton, Rieber,
Lee and Utecht
ATTORNEYS June 13, 1972 C. K. FREDERICKS 3,669,820
CELLULAR STRUCTURE
Filed June 19, 1970 7 Sheets-Sheet 5
FIG.13
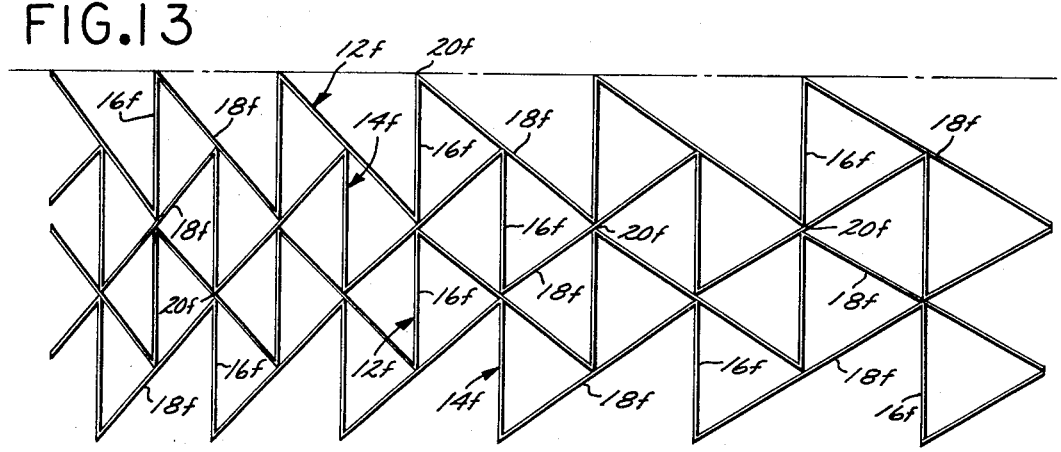
FIG.14
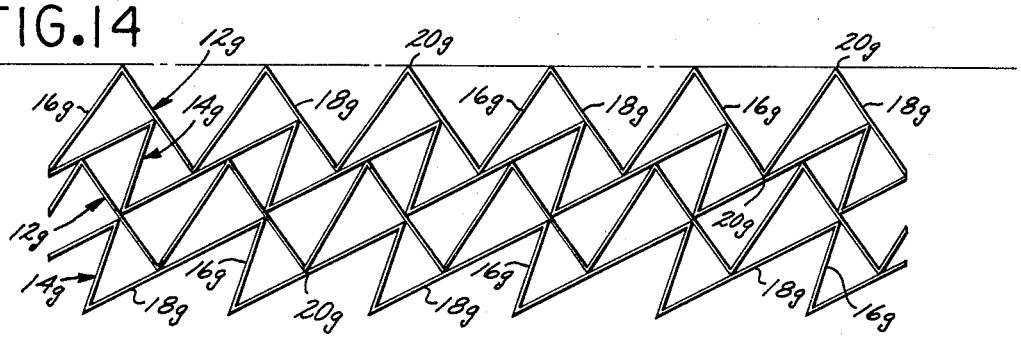
FIG.15
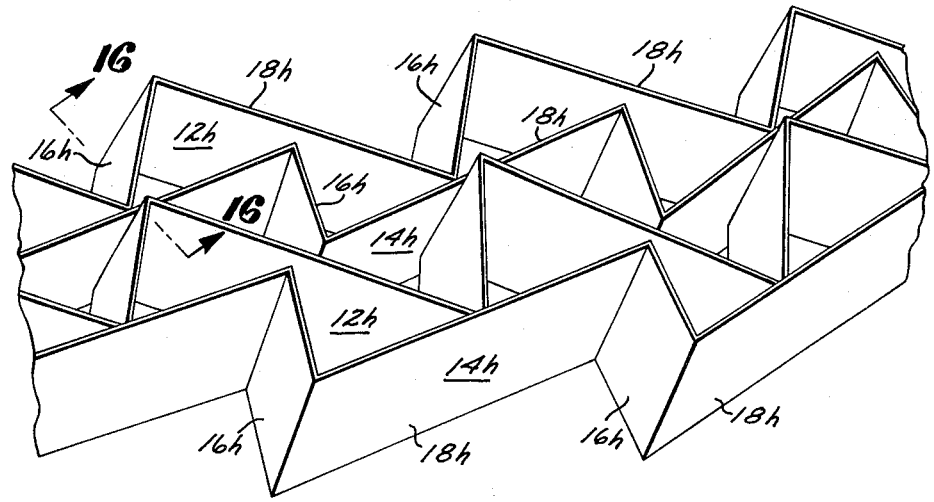
FIG.16
INVENTOR.
CARL K. FREDERICKS
BY Fulwider, Patton, Rieber,
Lee and Utecht
ATTORNEYS June 13, 1972     C. K. FREDERICKS     3,669,820

CELLULAR STRUCTURE

Filed June 19, 1970     7 Sheets-Sheet 7

INVENTOR.
*CARL K. FREDERICKS*

BY *Fulwider, Patton, Rieber,*
*Lee and Utecht*
ATTORNEYS

United States Patent Office 3,669,820
Patented June 13, 1972

3,669,820
CELLULAR STRUCTURE
Carl K. Fredericks, San Diego, Calif., assignor to Corlite Corporation, San Diego, Calif.
Continuation-in-part of application Ser. No. 865,087, Oct. 9, 1969. This application June 19, 1970, Ser. No. 47,710
Int. Cl. B32b 3/12, 3/28
U.S. Cl. 161—68                              12 Claims

ABSTRACT OF THE DISCLOSURE

A cellular, honeycomb-like structure comprised of a plurality of elements in stacked or juxtaposed relation, and each having a pattern of corrugations. At least every other element is characterized by a plurality of pairs of sections of dissimilar length which each define a corrugation. The corrugations of adjacent elements internest to define closed, generally triangular cells. It is characteristic of the structure that the peaks or nodes of the corrugations of each element engage upon the internode portions or slopes of the corrugations of the adjacent element. During assembly this enables relative movement between the elements until internesting is achieved. It is also characteristic of the structure that each cell is defined by one complete internodal section and portions of a pair of internodal sections of two adjoining elements. Various configurations of the structure for various purposes are disclosed.

CROSS-REFERENCE TO RELATED APPLICATION

This is a continuation-in-part of U.S. patent application Ser. No. 865,087, filed Oct. 9, 1969, now abandoned and the benefit of the filing date thereof is claimed for the subject matter which is common to that application and the present application.

BACKGROUND OF THE INVENTION

Field of the invention

The invention relates to cellular, honeycomb-like structures, and particularly to such a structure in which all of the elements forming the structure are corrugated, with the corrugations of adjacent elements internested to define generally triangular cells.

Description of the prior art

In the past, most conventional cellular, honeycomb-like structures have been fabricated in one of two ways. The first way involves the expansion or pulling apart of a laminate of sheets of material bonded or adhered together at predetermined areas. More particularly, a flat sheet of the material which is to form the cellular structure is provided with a plurality of parallel, spaced apart stripes of adhesive. The subjacent sheet of material is similarly provided with stripes of adhesive, but with the stripes located intermediate the stripes of the superjacent sheet of material. This alternating pattern of stripes is continued throughout the stack of sheets, and the whole is bonded together.

Next, the stack of bonded sheets is opened in the manner of an accordion to provide a plurality of hexagonal cells. This method suffers from various disadvantages. Since the cell wall sheet material must be deformable at a stress lower than that required to fail the adhesive bond, thereby enabling the stack to be expanded, the strength and thickness of the cell walls is greatly limited. Thus, a cellular structure having tiny cells of heavy gauge material cannot be produced. In addition, by virtue of the necessary expansion process involved, cellular structures made of resilient material cannot be satisfactorily produced because of the tendency of the material to spring back, destroying the desired cell geometry.

Another method of the prior art involves the utilization of preformed elements which are arranged in complemental fashion to provide the desired cell form, such as a hexagon form. Where a hexagonal cell pattern is desired, the complemental preformed elements forming the halves of the cells must be very accurately aligned so that their points of engagement or nodes are accurately located. This generally requires the utilization of mandrels located internally of the cell walls, the mandrels also being utilized to provide the back-up structure which enables development of the pressures generally required at the nodes to effect proper bonding in the node areas. A variation of this method utilizes a stack of alternate straight and corrugated elements to form triangular cells. However, a uniform cell array is very difficult to achieve because of the problems inherent in aligning the nodes of the corrugated elements.

The commonly practiced methods of the prior art involving hexagonal cell configurations also require that the securement or bonding between adjacent elements forming the cellular array be over an area. Such area contact, as compared to line contact, requires double walls in the bond areas and, consequently, undesirable extra weight.

Cellular structures of the prior art are primarily used as core materials in so-called "sandwich" constructions. In that type of construction the cellular core material is bonded or otherwise suitably secured at its opposite surfaces to facing sheets or skins. These skins strengthen the assembly, particularly in bending. Without such facing skins the hexagonal cells of the cellular structure tend to flatten or collapse when subjected to bending loads. Consequently, cellular structures of the prior art could not be used in any long spans without facing skins or auxiliary supports. This prevents their use in decorative applications, such as patio covers, where display of their cellular pattern is desired. The tendency of prior art cellular structures to sag is typical of all non-triangular cell configurations, the lack of rigidity being occasioned by cell collapse or folding at the cell wall junctures or bend lines.

SUMMARY

According to the present invention, a cellular, honeycomb-like structure is provided which is vastly different from either of the previously described structures of the prior art. However, it more nearly resembles the prior art structure which is formed by stacking or attaching a plurality of preformed elements in place, one on top of the other.

The present invention utilizes elements having corrugations configured so that the nodes of the corrugations of each element engage upon the internode or sloping portions of the adjacent elements and are movable therealong during assembly to achieve a complete internesting. More particularly, at least every other element is characterized by short sections and long sections. Each short and long section joins or merges to form a node, with the node and the adjacent short and long sections defining one corrugation. The short and long sections thus constitute internodal sections.

The elements are assembled, as by stacking them, so that the corrugation nodes of each element engage upon the internodal sections of its neighbor elements. As will be more particularly described in the subsequent disclosure, this enables the elements to be moved longitudinally of one another during assembly. This in turn permits the nodes to move along the sloping, internodal sections until all of the nodes are properly engaged to effect complete internesting of the elements.

As will be seen, this arrangement provides a cellular structure in which the cells are generally triangular in form, and in which the nodal securement or bond need only involve line contact with adjacent elements. In addition, because of the capability of relative longitudinal movement in the nodal areas, the stacked elements tend to automatically position themselves properly with respect to one another. Consequently, only moderate pressure upon the stacked elements is needed to effect proper internesting. This eliminates any need for mandrels or accessory tooling to obtain alignment or to effect development of bonding pressure.

During assembly the end corrugations of the elements are constrained against endwise movement and flattening by suitable end restraints such as plates or the like. In addition, the first or bottom element of the stacked elements is constrained against collapse or endwise movement by a base plate or the like. By preserving the geometrical pattern of the bottom element the remaining elements are more easily aligned, as will be seen. However, both the end restraints and the base plate can be eliminated in an alternative assembly precedure which utilizes a plurality of stacked "doublets." A "doublet" is a pair of elements already secured together to prevent endwise movement and flattening of their corrugations. Stacked doublets are dimensionally stable and require only minimal pressure to achieve bonding therebetween. Use of stacked doublets also greatly facilitates proper internesting of elements which are made of flimsy, floppy materials, as will be seen.

With either of the foregoing arrangements, the preformed, stacked elements are automatically and accurately positioned so that adequate, positive pressure can be brought to bear against the nodal areas to achieve good bonds. By utilizing small radius nodes, the bond areas are essentially line bond areas or zones, thereby eliminating and therefore can be made to span relatively large areas. However, the nodal areas can be of large radius configuration, if desired, to produce bond areas of greater area and strength.

The generally triangular configuration of the cells formed in the present structure provides greater stability against lateral cell deformation and greater rigidity, as compared to the well-known hexagonal honeycomb cell structure. Consequently, the present cellular structure can be used as a structural core material between facing skins or sheets to provide a lightweight "sandwich" construction. However, by virtue of the substantial rigidity provided by the triangular cell array, which bears loads in truss-like fashion, the present structure is substantially self-supporting and can be used in decorative applications without such facing skins. The structure is rigid in bending and therefore can be made to span relativly large areas without sagging.

Other objects and features of the invention will become apparent from consideration of the following description taken in connection with the accompanying drawings.

BRIEF DESCRIPTION OF THE DRAWINGS

FIG. 6 is an end elevational view of a cellular structure in which the angular orientation of the legs or sides defining the corrugations is such that the triangular cells are right angular with the acute angles of each cell being similar;

FIG. 13 is an end elevational view of a cellular structure in which the proximity of the corrugations of each element vary with respect to one another, thereby providing cells of increasing size in one direction;

FIG. 14 is an end elevational view of a cellular structure in which the corrugations of alternate elements are characterized by legs of equal length;

FIG. 15 is a perspective view of another form of cellular structure according to the invention, and in which the legs or sides of the corrugations of alternate elements are inclined in two directions relative to the sides of the corrugations of the adjacent elements;

FIG. 16 is a section taken along the line 16—16 of FIG. 15;

FIG. 21 is an end elevational view of the cellular structure of FIG. 12, but with alternate elements reversed and nested for shipment or the like.

DESCRIPTION OF THE PREFERRED EMBODIMENTS

Figure 1:
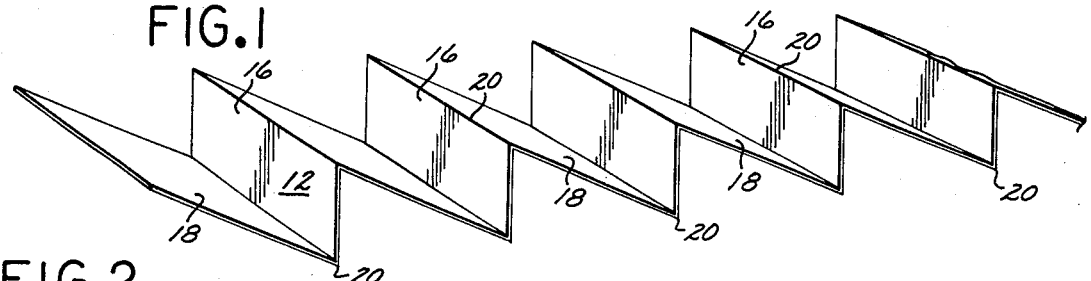
FIG. 1 is a perspective view of an element for use in forming the present cellular structure, the element being characterized by a saw-tooth pattern.
Figure 2:
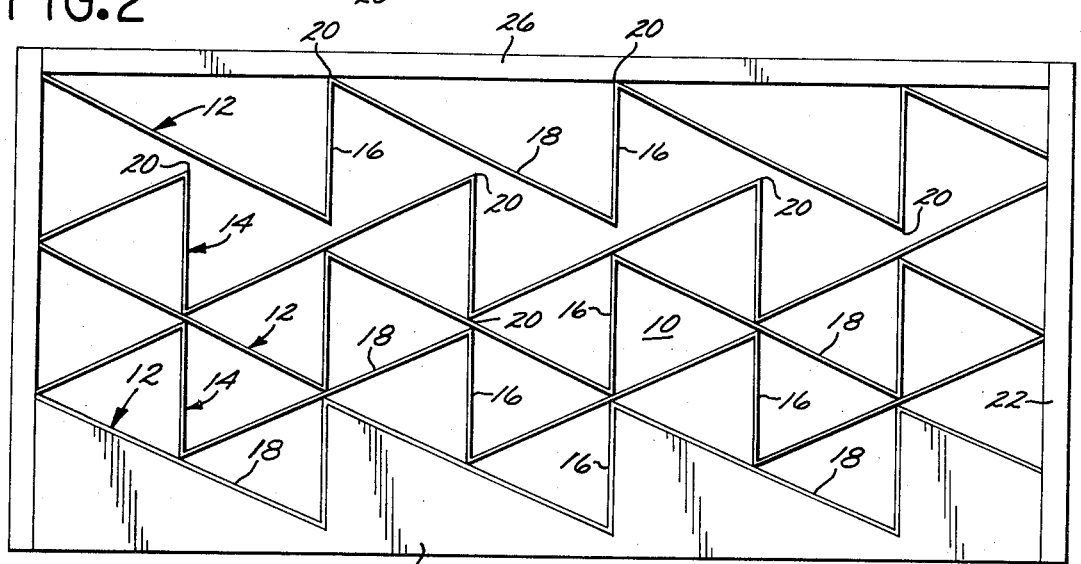
FIG. 2 is an end elevational view of a plurality of stacked or juxtaposed elements like the element of FIG. 1, alternate ones of said elements being reversed in direction for interengagement or internesting in a predetermined pattern.

Referring now to the drawings, and particularly to FIGS. 1 and 2, there is illustrated a cellular structure 10 according to the present invention which comprises, generally, first and second elements 12 and 14 which are characterized, respectively, by a series of uniform waves or corrugations. The corrugations of element 12 are identical to each other, and the corrugations of the element 14 are identical to each other. In the structure 10 the corrugations of the elements 12 are also identical to the corrugations of the elements 14. The structure 10 is an exemplary embodiment of the invention and, as will be seen subsequently, other embodiments of the invention differ in several respects.

Each corrugation of either the element 12 or the element 14 is defined by a succession of short and long sections 16 and 18, respectively, whose junctures define successive crests and valleys or nodes 20.

As best viewed in FIG. 2, the long sections 18 of the elements 12 are similarly directionally oriented, that is, they each slope downwardly and to the right as viewed in the drawings. Of course, the terms downwardly, upwardly, to the right or left, and crests and valleys are purely relative terms and will vary according to the orientation of the cellular structure 10.

In contrast to the directional orientation of the long sections 18 of the elements 12, the long sections 18 of the elements 14 are oppositely or reversely oriented so as to slope upwardly to the right, as viewed in FIG. 2, transversely of the long sections 18 of the adjacent elements 12. This directional orientation is achieved by simply reversing the direction or angularity of the alternate ones of the elements, that is, the elements 14 are reversely oriented with respect to the elements 12.

With this arrangement, the upper or alternate ones of the nodes 20 of the elements 14 engage successive long sections 18 of the superposed or adjacent element 12, while the lower or alternate ones of the nodes 20 of the elements 12 engage successive ones of the long sections of the adjacent elements 14. This forms a plurality of generally triangular cells, each defined by a short section 16 and portions of a pair of the adjacent long sections 18.

The stacked elements 12 and 14 may be secured together in any suitable fashion, depending upon the material of which the elements are made and the application for which the structure 10 is designed. For example, the material of the elements 12 and 14 can be made of resin reinforced glass fiber material, aluminum, magnesium, stainless steel, boron or graphite filament reinforced materials, and suitable for load bearing or decorative purposes. Securement of the elements 12 and 14 to one another can be effected by adhesively coating the nodes 20, and sometimes also the portions of the long sections 18 to which they are to be bonded, by welding, brazing soldering, riveting, and various other techniques which will immediately suggest themselves to those skilled in the art.

In one method of assembly, the elements 12 and 14 are made of thin aluminum foil which is provided with an adhesive stripe (not shown) upon the nodes 20, with the elements 12 and 14 being stacked as shown in FIG. 2. Since the thin foil may have a tendency to move laterally, the ends of the elements are constrained in any suitable fashion against such movement, such as by use of a pair of plates 22. In addition, the nodes 20 of the bottom element 12 also have a tendency to move endwise or laterally, and a saw-tooth configured base 24 is employed to prevent this. The elements are stacked above the base plate 24, with the bottom element 12 nested in the plate 24 as illustrated. A platen 26 is arranged upon the uppermost of the elements and urged downwardly with sufficient pressure to generate adequate pressure at the nodes 20.

In FIG. 2 the uppermost element 12 is shown just prior to being urged into contact with the subjacent element 14.

It is an important feature of the present invention that the nodes 20 of, for example, the elements 12 tend to slide upon the adjacent long sections 18 of the elements 14 until the nodes 20 of the elements 14 are properly engaged with the long sections 18 of the elements 12. There is an automatic movement and alignment under the relatively light pressure of the platen 26. The sections, such as the short sections 16, tend to align themselves exactly, one above the other, as seen in FIG. 2. This alignment and pressure is achieved without utilization of any mandrels or the like disposed internally of the cells of the structure 10. As can be seen from the drawings, this unique result is achieved in part by reason of the unequal lengths of the legs or sections 16 and 18, as well as by reason of the orientation of the elements 14 relative to the elements 12.

There is virtually no limit to the number of elements 12 and 14 which can be juxtaposed in the described relation, so that very large structural sections can be produced. The length or depth of the cells is determined by the width of the elements 12 and 14 utilized. Alternatively, a structure 10 of relatively great depth can be produced, and later sawed or otherwise cut into sections having the cell length or thickness of structure 10 desired.

Figure 3:
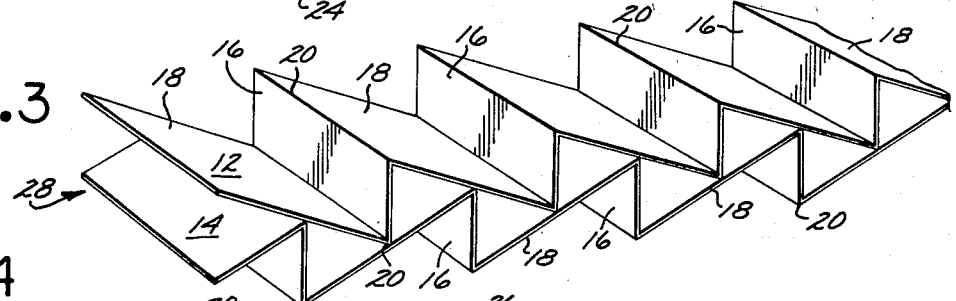
FIG. 3 is a perspective view of a doublet formed by securement together of a pair of the elements of FIG. 1, one of the elements being reversed in direction as compared to the other.
Figure 4:
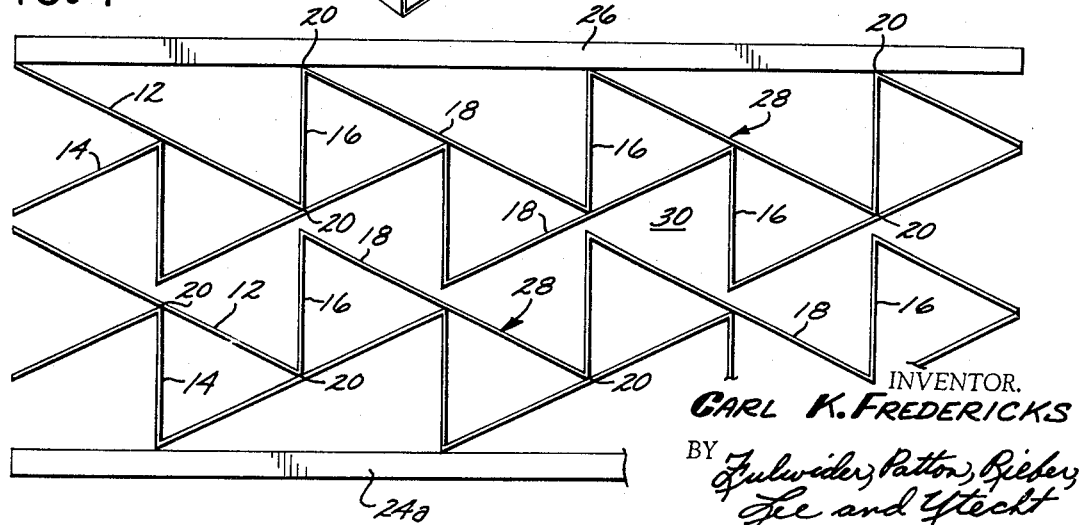
FIG. 4 is an end elevational view of a plurality of the doublets of FIG. 3 in stacked relation, the upper doublet being shown just prior to engagement with the lower doublet.

To facilitate assembly of the elements 12 and 14, particularly where the elements 12 and 14 are formed of generally thin or flexible material which tends to flatten out and destroy the desired shape of the corrugations, a plurality of doublets 28 are utilized, as best seen in FIG. 3. The doublet 28 is comprised of a pair of elements 12 and 14 secured or bonded in any suitable fashion. Such securement, as illustrated, prevents the elements 12 and 14 from moving laterally relative to one another. Consequently, a plurality of the doublets 28 can be stacked upon one another, as best seen in FIG. 4, to provide a cellular structure 30 comprised of a plurality of secured together doublets 28. In this arrangement utilization of end plates 22 is unnecessary, and only the platen 26 is needed to achieve the necessary bonding pressure at the nodes 20.

Figure 5:
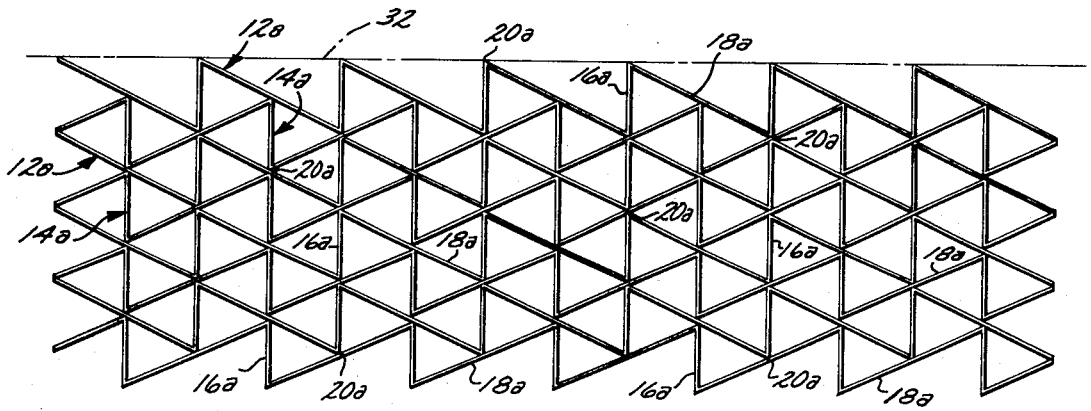
FIG. 5 is an end elevational view of a cellular structure in which the angular orientation of the legs or sides defining the corrugations is such that the triangular cells are equilateral.
Figure 6:
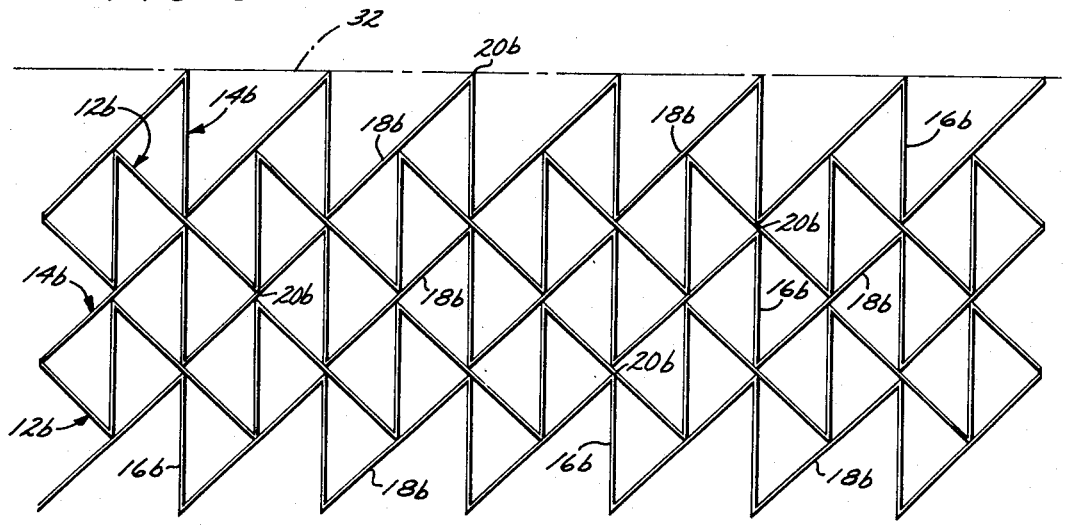
Figure 7:
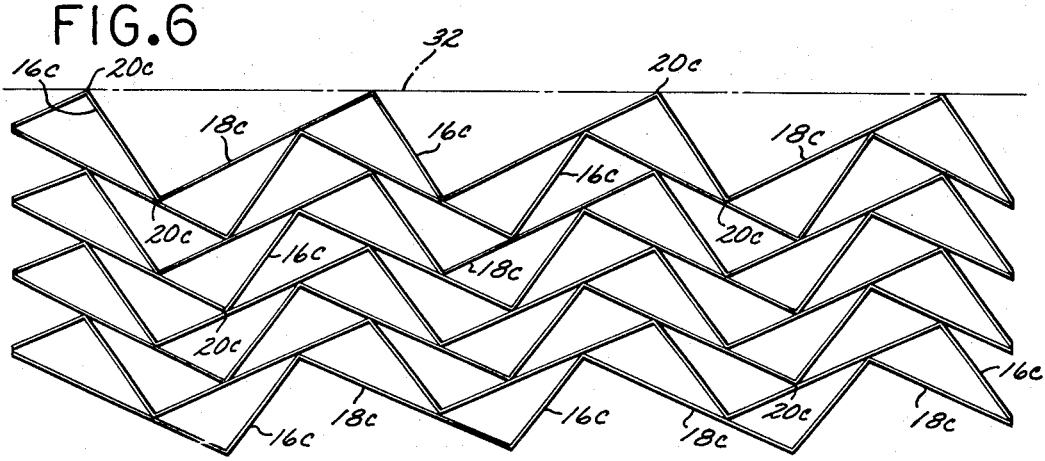
FIG. 7 is an end elevational view of a cellular structure in which the angular orientation of the legs or sides defining the corrugations is such that the triangular cells are close to right angular with the acute angles of each cell being dissimilar.

FIGS. 5, 6, and 7 illustrate several of a large number of different configurations of cells, each providing its own distinctive set of physical properties and aesthetic qualities. The pattern or array of FIG. 5 is achieved by utilizing short sections 16a disposed perpendicular to an imaginary plane 32 passing through alternate nodes 20a of the associated one of the elements 12a or 14a, as the case may be. In FIG. 5, the triangular cells are equilateral by arranging the long sections 18a so as to dispose them at an included angle of approximately sixty degrees relative to the short sections 16a.

Figure 10:
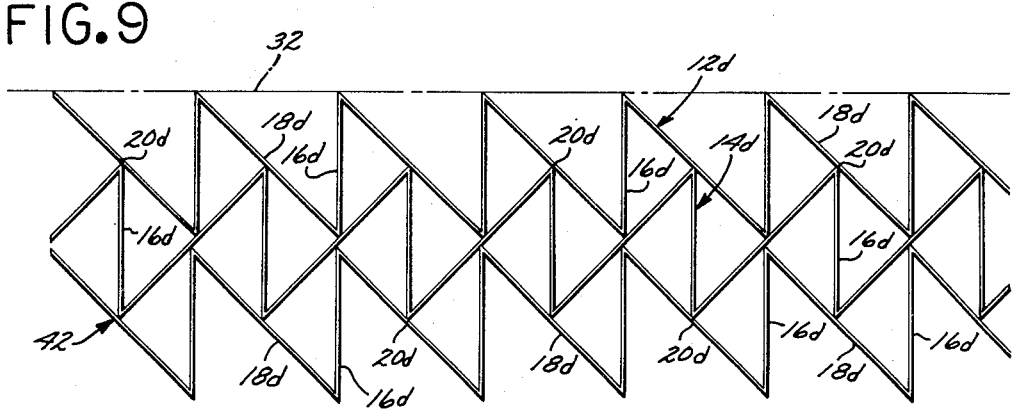
FIG. 10 is an end elevational view of a triplet, formed by assembly of three of the elements of FIG. 1.
Figure 11:
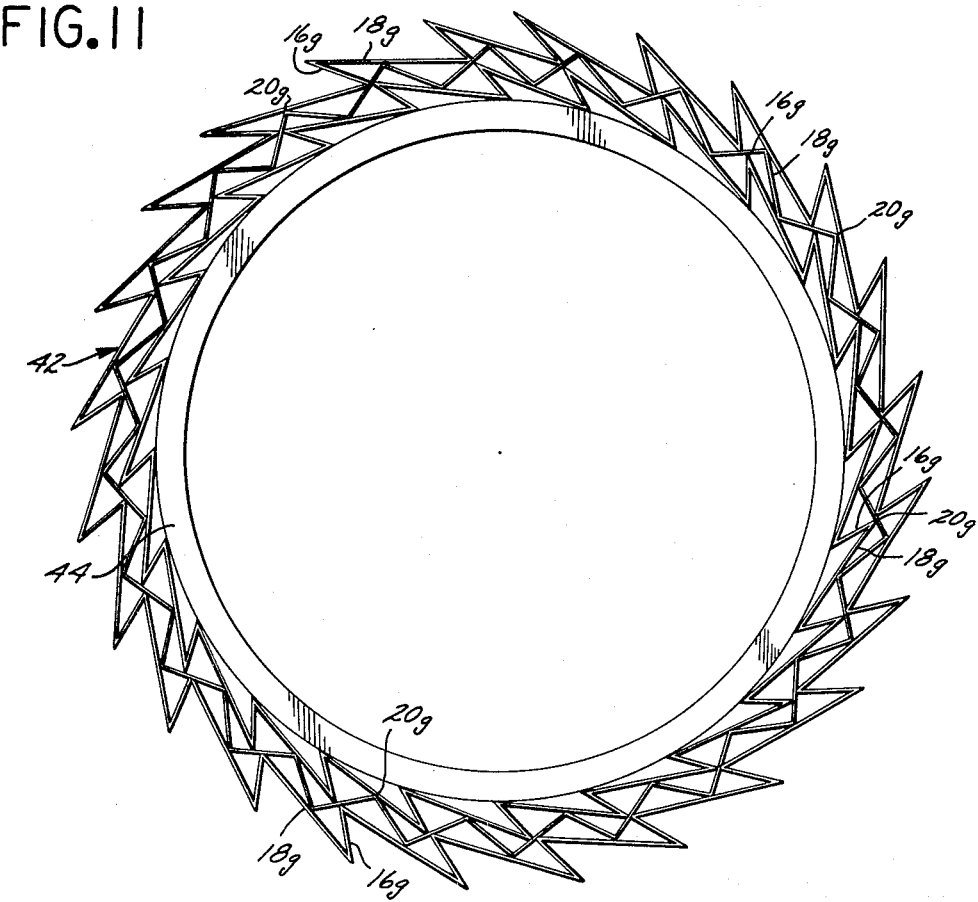
FIG. 11 is an end elevational view of a cylindrical container surrounded by the triplet of FIG. 10 in an energy absorption application.
Figure 12:
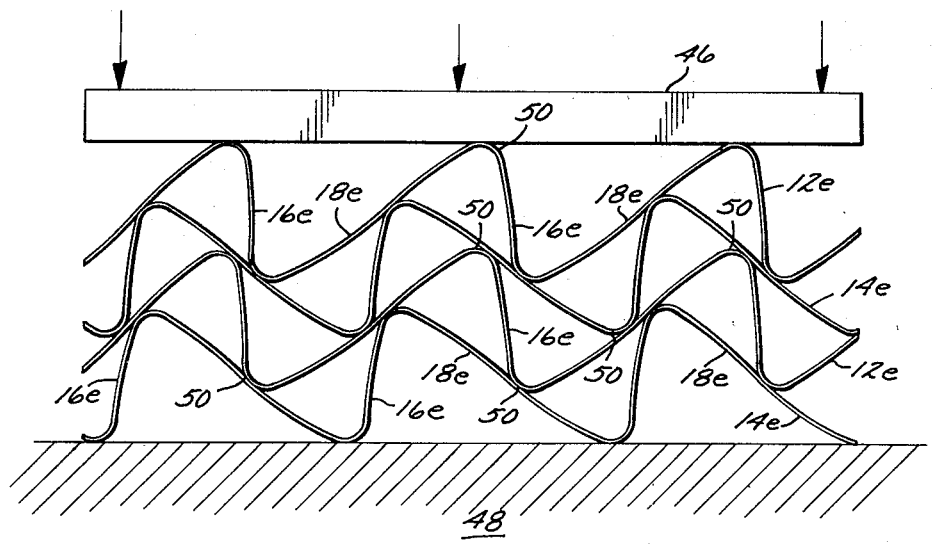
FIG. 12 is an end elevational view of a plurality of stacked or juxtaposed elements having relatively large radius nodes which are not bonded, the structure being illustrated in an energy absorption application.

General similarity of certain elements of FIGS. 5, 6, 7, 10, 12, 13, 14, 15 and 16 to the elements 12, 14, 16, 18 and 20 of FIGS. 1–4 is denoted by letter subscripts adjacent the numerals, as follows: FIG. 5 ("a"); FIG. 6 ("b"); FIG. 7 ("c"); FIG. 10 ("d"); FIG. 12 ("e"); FIG. 13 ("f"); FIGS. 11 and 14 ("g"); and FIGS. 15 and 16 ("h").

In FIG. 6, the cellular structure is characterized by short sections 16b disposed substantially perpendicular to the imaginary plane 32, and is further characterized by a disposition of the long sections 18b at an angle of approximately forty-five degrees to the short sections 16b.

In the cellular structure of FIG. 7, the short sections 16c are arranged to intersect the imaginary plane 32 at an included angle of approximately sixty degrees, while the long sections 18c are arranged to intersect the short sections 16c at an included angle of approximately one hundred degrees.

Figure 8:
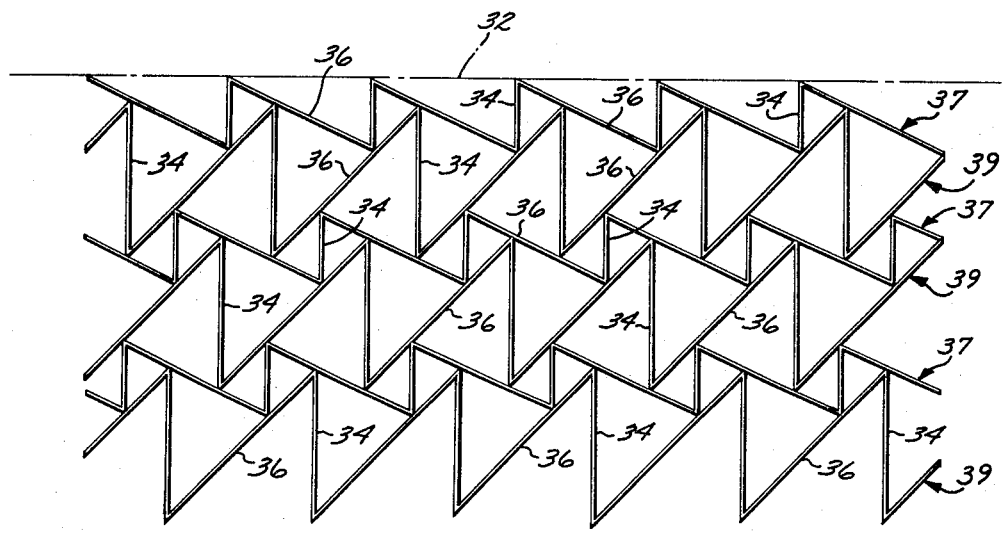
FIG. 8 is an end elevational view of a cellular structure in which the dimensions of alternate ones of the stacked elements are dissimilar, thereby providing two sizes of cells in the array.

FIG. 8 illustrates yet another form of cellular structure according to the present invention, the dimensions of the long sections 36 and the short section 34 of first elements 37 being smaller than those of the alternate or second elements 39. The dissimilar dimensions of the elements 37 and 39 provide two sizes of triangular cells, which renders the arrangement suitable for decorative applications.

Figure 9:
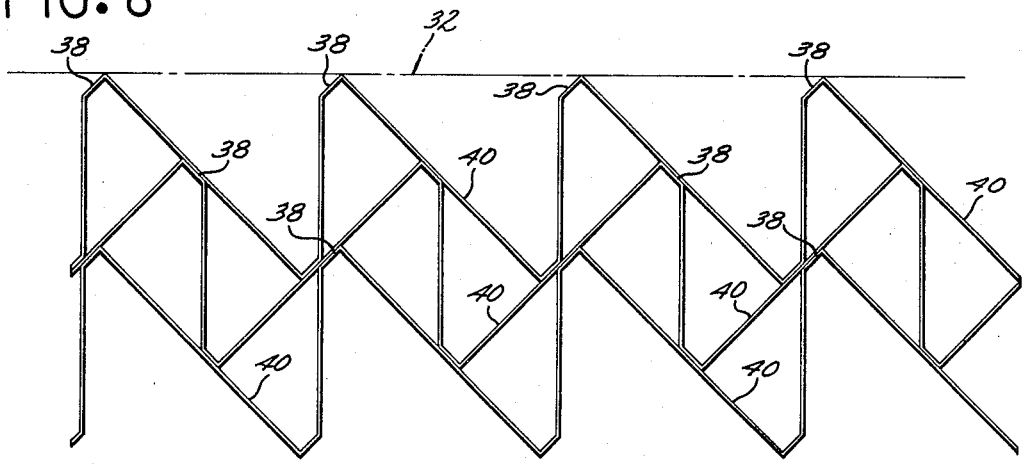
FIG. 9 is an end elevational view of a cellular structure in which the nodal areas are flattened to provide an increased area for securement or bonding between adjacent ones of the elements.

The cellular structure of FIG. 9 is essentially identical to the cellular structure 10 of FIG. 2, except that the nodal areas 38 are flattened to provide area contact with the adjacent long sections 40, as compared to the essentially line contact present in the structure 10 of FIG. 2. The structure of FIG. 9 affords a larger area for securement or bonding of the adjacent cell elements.

The structure of FIG. 10 comprising a triplet 42 is formed by a pair of elements 12d with a reversely oriented element 14d therebetween. The elements are secured together at their nodes 20d and the resulting assembly is sufficiently flexible, particularly if made of paperboard corrugated box material, for example, that it can be wrapped around a cylinder 44, as viewed in FIG. 11, to protect the cylinder or to protect fragile contents of the cylinder.

If desired, the corrugations of elements 12e and 14e may be formed with rounded nodes 50, as seen in FIG. 12, rather than the sharp angular nodes 20 of the structure 10 of FIG. 2. The nodes 50 are connected by smoothly faired sections, as illustrated. Such sections normally are relatively straight although they may be slightly curvilinear, as illustrated, if desired.

If the elements 12e and 14e are made of relatively stiff material, they will retain their corrugated shape of their own accord, without resort to an arrangement such as that of the doublets 28 to hold their shape. A plurality of such relatively stiff elements 12e and 14e can be assembled, as shown in FIG. 12, without attaching the elements at their nodes 50. The elements are merely stacked upon one another, with the asembly being loosely held together by gravity.

Such a plurality of stacked elements is useful as an energy absorption structure, as by interposition of the layer of stacked, corrugated elements between relatively movable components 46 and 48. Any tendency of the components 46 and 48 to move towards one another will create a tendency of the stacked elements to distort by bending and by sliding on one another, thereby more closely nesting together.

If the elements are made of a resilient material such as spring steel that will bend without permanent deformation, then the plurality of stacked elements will act like a spring, the corrugations nesting together under the force imposed by the components 46 and 48 moving together, but springing back essentially into their original configuration upon release of such force as the components 46 and 48 move apart. If the elements are made from a material that will permanently deform under such force, as for example soft aluminum or copper, then the plurality of stacked elements absorb the energy upon being compressed by the relative movement of components 46 and 48.

It is apparent, then, that the plurality of stacked elements can be made to work like a compression spring with little energy absorbed, or as an energy absorber with appreciable energy absorbed, or intermediately, depending upon the materials of construction and upon such factors as the size of the corrugations, the thickness of the elements, the stiffness of the element material, etc. The character of these and other parameters may therefore be selected to fit the particular application. Accordingly, the term "energy absorber," "absorber," or "spring," as used herein, is to be construed as comprehending both springs and energy absorbers, as well as combinations thereof.

The elements 12e and 14e as seen in FIG. 12 are characterized by rounded nodes 50 rather than sharply angular nodes, as in FIG. 3, for example. While a rounded node is a preferred shape to facilitate bending and sliding of the elements on one another while the assembly acts as an energy absorber, it is not critical that the nodes be rounded. Sharp angular nodes might be preferred in certain materials or for certain applications, such as to vary the coefficient of friction during relative sliding of the elements.

Figure 17:
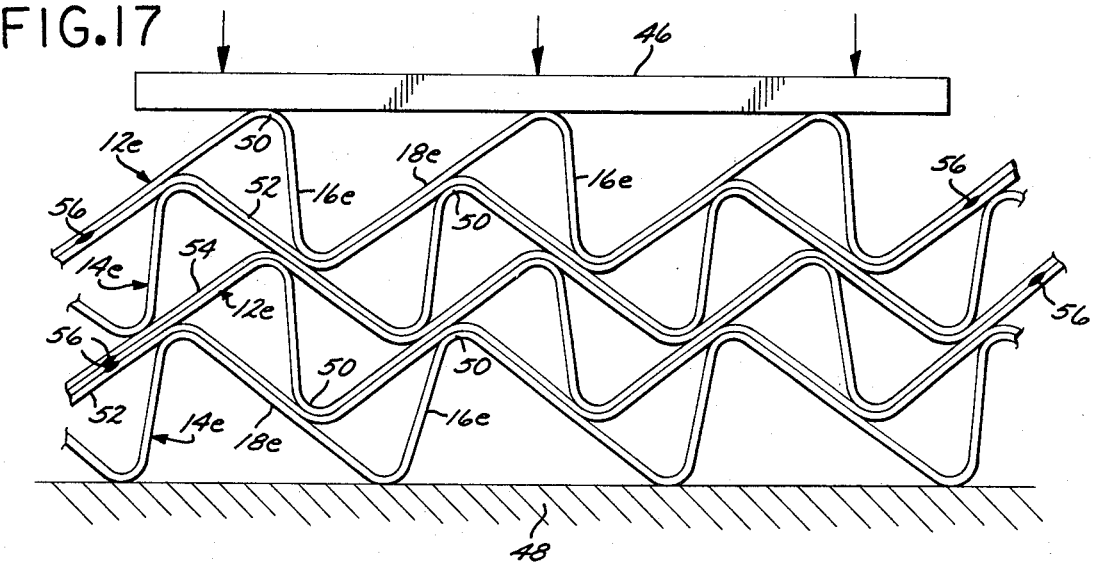
FIG. 17 is an end elevational view of a cellular structure in which permanently deformable elements are interleaved between alternate ones of a plurality of stacked elements, the cellular structure being illustrated in its undeformed state.
Figure 18:
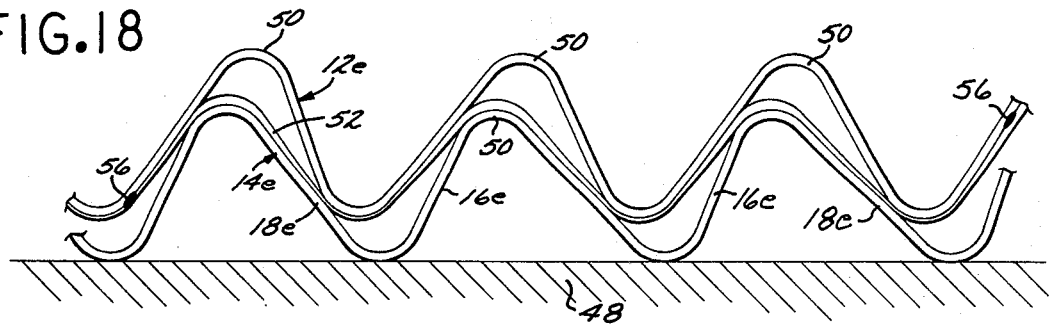
FIG. 18 is an end elevational view of a pair of the elements of the structure of FIG. 17, with one of the deformable elements interleaved therebetween, and illustrating the structure in a deformed state.

Referring now to FIGS. 17 and 18, there is illustrated another structure according to the invention, in which ductile or permanently deformable elements 52 and 54 are interleaved between each pair of corrugated elements 12e and 14e. In this embodiment, the elements 12e and 14e are resilient so as to return essentially to their original corrugated shape upon movement apart of the components 46 and 48. FIG. 17 shows the assembly loosely positioned between the relatively movable components. FIG. 18 shows a representative pair of the elements 12e and 14e more deeply internested under the force developed by the components 46 and 48 moving closer together, with the interleaved elements 52 and 54 stretched to conform to the new geometrical pattern, and with resulting energy absorption by the assembly. The structure will continue to absorb energy until the interleaved elements fail or until complete internesting has been achieved, whichever occurs first. Upon subsequent loadings by the relatively movable components, even if the interleaved elements have been broken, the structure will continue to act like a compression spring. Furthermore, the structure may be "reset" to again act as an energy absorber merely by removing the stretched elements 52 and 54 and replacing them with new ones of the original contour. It may be desirable with certain materials to attach elements 52 and 54 to elements 12e and 14e at points 56, as by suitable adhesives or by welding, for instance, to prevent sliding of the interleaved elements. However, the tendency under load of the interleaved elements to lock at the junctures of the nodes 50 and the long sections 18e will generally make this attachment unnecessary.

Figure 19:
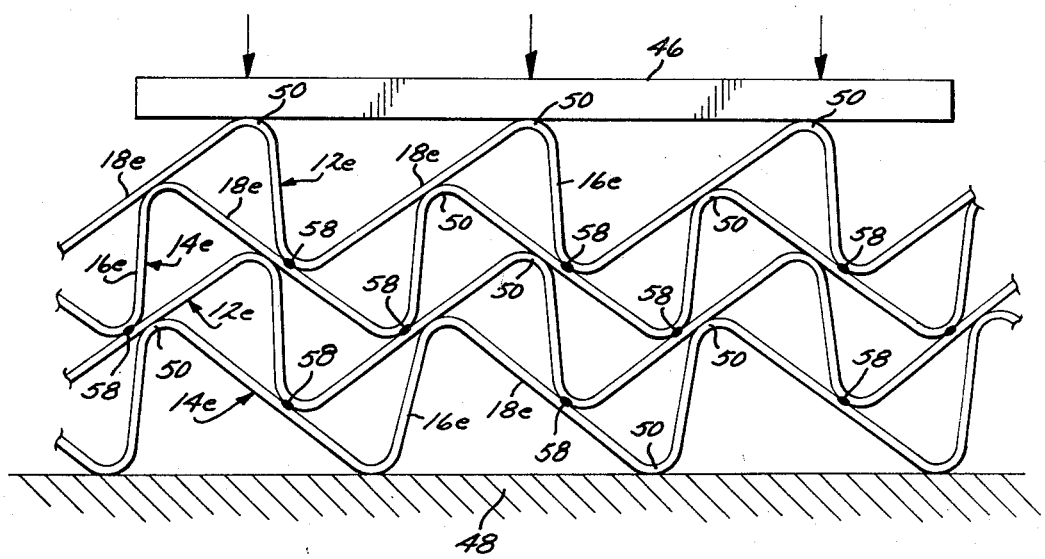
FIG. 19 is an end elevational view of a cellular structure like that of FIG. 12, but with certain of the nodes attached to adjacent elements for handling or the like while preserving its general capacity for energy absorption.

Referring now to FIG. 19, an embodiment of the invention is illustrated which is essentially identical to the embodiment of FIG. 12, except for certain nodal attachments. More particularly, if alternate nodes 50 of each element 12e and 14e are attached to the long sections 18e of each element 12e and 14e at points 58 in the plurality of stacked elements, with the remaining nodes left unattached at their junctures with the long sections 18e, the structure still acts like a spring or an energy absorber in essentially the same manner as though all nodes are left unattached as in FIG. 12. However, the nodal attachments 58 are useful in holding the entire structure together, as for example for handling purposes, greatly facilitating the practical use of the invention for certain applications. The points of attachment at 58 are merely exemplary, and other points of attachment may be utilized if desired, so long as the attachment points are chosen such as to cause no undue impairment of the ability of the stacked elements to compress into one another under load from the relatively movable components 46 and 48.

Figure 20:
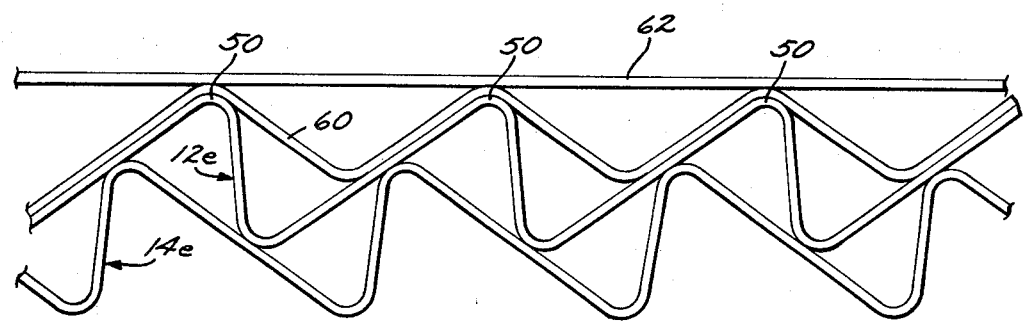
FIG. 20 is an end elevational view of a pair of the elements of FIG. 12, with the addition of an undulating element and a straight element to improve load distribution into the remainder of the structure without undesirable buckling of the outermost elements.

FIG. 20 illustrates yet another embodiment of the invention adapted for use as an energy absorbing structure. Because certain configurations of movable components 46 and 48 may not have flat faces as depicted, it would be preferable in such a case to provide a means for spanning and reinforcing the outer corrugations or nodes 50 of the plurality of stacked elements. Accordingly, an undulating or wave-like element 60 is nested in the corrugations of the outer element 12e to provide reinforcement, and a straight element 62 is assembled next to the element 60 for further reinforcement and to further insure uniform load distribution into the energy absorbing structure. This structure is useful, for example, where the energy absorbing structure is a boat slip bumper. The movable element 46 in that case would be the bow of the boat, and the existence of the straight element 62 prevents the bow from locking into the corrugations of the structure and tearing it apart.

Elements 60 and 62 may either be attached to the outside element, in this case the element 12e, or to each other, or left partially or entirely unattached, as desired, depending on the application of interest. Either or both elements 60 and 62 may be attached without appreciably changing the total deflection characteristics of the assembly, although a somewhat different distortion of the nested corrugations occurs because of the restraint of the attached corrugations against the slight sidewise movement they want to undergo.

Figure 21:
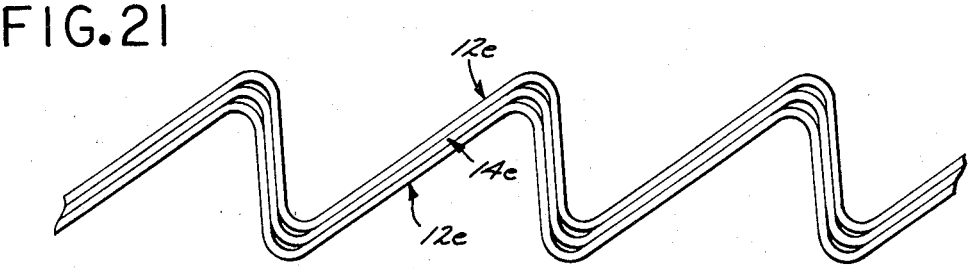

FIG. 21 illustrates the manner in which the elements 12e and 14e of FIG. 12 may be nested to facilitate storage, shipment, and handling. The middle element 14e of those illustrated is simply reversed in position to permit such nesting.

Figure 22:
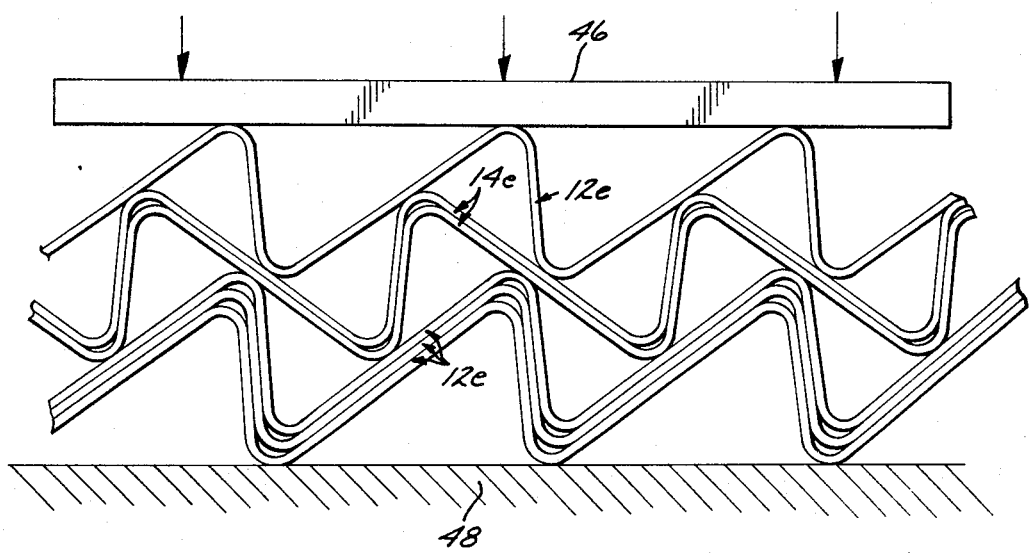
FIG. 22 is an end elevational view of a cellular structure similar to FIG. 12, but illustrating a modified utilization of the energy absorbing elements.

Another embodiment of the invention is illustrated in FIG. 22. This shows a variation in the manner of arranging the plurality of stacked elements 12e and 14e to create, for example, a graded or stronger structure. In this case two or three of the elements 14e and 12e are nested together for additional strength. If desired, one or more of these additional elements may be made of a material such that it functions in a manner similar to that of the element 52 of the embodiments of FIG. 17 or 18. It will be apparent that the elements may be thus nested in any of a large number of combinations, permitting the construction of a variety of springs and energy absorbers by differently arranging a series of identical elements. Dissimilar elements may also be made to nest in this manner, permitting the fabrication of a still greater variety of structures.

Referring now to FIG. 13, there is illustrated yet another cellular arrangement according to the invention, in which the first elements 12f are characterized by short sections 16f which are of the same length throughout the length of the element 12f, but the long sections 18f are progressively longer in one direction. Likewise, the second elements 14f are similarly configured with the short sections being of equal dimension to one another, but with the long sections being of increasingly greater length to the right, as viewed in FIG. 13. This is useful in certain applications because it produces cells of increasing size in a longitudinal direction. The structure is also useful in decorative applications where the dissimilar cell size is aesthetically attractive.

Referring to FIG. 14, there is illustrated yet another cell array according to the invention, the particular array shown being characterized by alternate first elements 12g having sections 16g and 18g of equal length. However, it is important to note that the second elements 14g include the characteristic long and short sections. This cell array is illustrative of the fact that the generally triangular cell configuration of the present invention is achieved with juxtaposed corrugated elements so long as at least alternate ones of the elements, in this case the elements 14g, are characterized by long and short sections between the nodes.

FIG. 15 is illustrative of a structure in which the alternate elements 12h and 14h are inclined in two directions relative to one another. For example, the cell array of FIG. 2 is characterized by cell walls which all lie in planes which are perpendicular to the plane of the paper on which FIG. 2 is drawn. In contrast, the cell walls of the elements 12h and 14h are inclined with respect to such plane. This produces an offset relationship between the elements at the nodal areas, as best viewed in FIG. 16, assuming that the elements 12h and 14h are of uniform depth throughout their length. The cellular array of FIGS. 15 and 16 is particularly adapted for decorative applications.

Summarizing the foregoing configurations, it will be apparent that each of the configurations is characterized by a substantially triangular cell, that all of the elements constituting the core array are corrugated. Moreover, each cell defining the cellular structure is characterized by a wall formed by an entire section or leg of a corrugation, and by portions of the legs or sections of two adjoining corrugations. The elements may be joined in the form of doublets or triplets as manufacturing aids, which is particularly important where the elements of the structure are made of relatively flimsy material. The shape and size and arrangement of the triangular cells is infinitely variable to provide innumerable cell patterns for decorative purposes. The core array is rigid in bending, even without the use of facing or sandwich skins, because of the truss-like structure created by the triangular configuration. The elements can also be assembled in unbonded relation for use as energy absorbers. Of particular importance in all of the foregoing structures is the arrangement of the alternate elements such that they tend to interengage and automatically position their nodes into correct alignment, without resort to internal mandrels or the like. This positioning or alignment can be maintained relatively easily, as previously described, so that it is possible to provide a welded or brazed connection at each of the nodes without having to utilize any secondary tooling or internal mandrels. In addition, each of the elements can be made of decreasing height from one end to the other so that the assembled elements will form a tapered structure. Such a structure is useful, for example, as a truss-like structure which can be used in conjunction with facing skins attached to the outermost corrugation nodes to provide a tapered structure panel. Various tapers, undulations, compound forms and the like can thus be provided simply by utilizing elements of appropriate dimensions and configurations.

Where the core arrays of FIGS. 2, 4, 5, 6, 10 or 13 are used, the structures are rigid in all directions because the nodes meet on each side of an intervening element. Where this is not the case, as in FIG. 7, the structure can be squeezed or collapsed to a certain extent, although it will not sag when spanning an area.

In view of the fact that the nodes of the elements 12 and 14 may be either sharply angular, rounded, or flattened, the term "node" as used in the appended claims is to be construed as comprehending these and analogous node shapes. Likewise, the term "sections" used in the claims comprehends the internodal sections between the nodes, whether such sections be planar, curved, of equal length, smooth, or characterized by a series of smaller or secondary wrinkles or corrugations (not shown) for improved columnar rigidity.

Various modifications and changes may be made with regard to the foregoing detailed description without departing from the spirit of the invention.

I claim:

1. A cellular structure comprising:
   first and second corrugated elements, each of the corrugations of said elements being defined by a succession of short and long sections whose junctures define nodes, said long sections of said first element being similarly directionally oriented, said second element being arranged oppositely of said first element with said long sections of said second element being directionally oriented similarly to one another but generally transversely of the directional orientation of said long sections of said first element whereby alternate ones of said nodes of each said second element engage successive ones of said long sections of the adjacent said first element, and alternate ones of said nodes of said adjacent first element engage successive ones of said long sections of said second element, thereby to form a plurality of cells each defined by one of said short sections, and by portions of a pair of adjacent said long sections of said first and second elements; and
   means maintaining said first and second elements in engaged relation.

2. A cellular structure according to claim 1 wherein only a single said first element and a single said second element are in engaged relation, said alternate ones of said nodes of said second element being secured to said first element and said alternate ones of said nodes of said first element being secured to said second element to constrain said elements against movement relative to one another.

3. A cellular structure comprising a plurality of individual structures according to claim 2, said individual structures being similarly directionally oriented and secured together at the nodes thereof to form an array of closed cells.

4. A cellular structure according to claim 1 wherein each said short section is generally planar, dimensionally identical, and substantially perpendicular to an imaginary plane passing through alternate nodes of the associated one of said elements.

5. A cellular structure according to claim 4 wherein each said long section is generally planar, dimensionally identical, and intersects the plane of the adjacent said short section at an included angle of approximately sixty degrees.

6. A cellular structure according to claim 4 wherein each said long section is generally planar, dimensionally identical, and intersects the plane of the adjacent said short section at an included angle of approximately forty-five degrees.

7. A cellular structure according to claim 1 wherein each said short section is generally planar, dimensionally identical, and intersects at an angle of approximately sixty degrees an imaginary plane passing through alternate nodes of the associated one of said elements; and wherein each said long section is generally planar, dimensionally identical, and intersects the plane of the adjacent said short section at an included angle of approximately ninety degrees.

8. A cellular structure according to claim 1 wherein the dimensions of said long and short sections of said first element are different from that of said second element.

9. A cellular structure according to claim 1 wherein each of said nodes is defined by a relatively sharp bend whereby engagement of said node with the adjacent said long section provides line contact.

10. A cellular structure according to claim 1 wherein each of said nodes is flattened to define a planar section whereby engagement of said node with the adjacent said long section provides area contact.

11. A cellular structure according to claim 1 wherein each of said nodes is curvilinear whereby each of said elements is characterized by an undulating, wave-like form.

12. A cellular structure according to claim 1 wherein each of said elements is characterized by a sawtooth pattern whereby each of said cells is triangular in configuration.

References Cited

UNITED STATES PATENTS

| | | | |
|---|---|---|---|
| 2,020,639 | 11/1935 | Grayson et al. | 161—135 X |
| 3,041,223 | 6/1962 | Sage | 161—135 X |
| 3,168,432 | 2/1965 | Elfving | 161—136 X |
| 3,432,859 | 3/1969 | Jordan et al. | 161—136 X |

JOHN T. GOOLKASIAN, Primary Examiner

H. F. EPSTEIN, Assistant Examiner

U.S. Cl. X.R.

161—135, 137; 206—46 FR; 229—14 C

UNITED STATES PATENT OFFICE
CERTIFICATE OF CORRECTION

Patent No. 3,669,820                    Dated August 25, 1972

Inventor(s) Carl K. Fredericks

It is certified that error appears in the above-identified patent and that said Letters Patent are hereby corrected as shown below:

Column 3, lines 41 and 42, cancel "and therefore can be made to span relatively large areas." and insert -- the undesired weight of double walls in the nodal areas. --

Column 6, line 74, cancel "section" and insert -- sections -- .

Signed and sealed this 19th day of December 1972.

(SEAL)
Attest:

EDWARD M. FLETCHER, JR.
Attesting Officer

ROBERT GOTTSCHALK
Commissioner of Patents